Patented July 31, 1928.

1,679,230

UNITED STATES PATENT OFFICE.

DONALD G. ROGERS, OF BUFFALO, NEW YORK, ASSIGNOR TO NATIONAL ANILINE & CHEMICAL COMPANY, INC., OF NEW YORK, N. Y., A CORPORATION OF NEW YORK.

PURIFICATION OF INDANTHRENE.

No Drawing.   Application filed March 8, 1923. Serial No. 623,732.

This invention relates to improvements in the process of purifying N-dihydro-1.2-1'.2'-anthraquinonazine.

In the production of the leuco compound of the dyestuff, N-dihydro-1.2-1'.2'-anthraquinonazine, by the action of fused caustic alkali on 2-aminoanthraquinone, there are formed at the same time various amounts of other products which are regarded as impuritites.

It has been heretofore proposed to treat the melt, obtained as the result of the fusion, with water and then precipitate the dyestuff by atmospheric oxidation, collect the precipitate by filtaration, wash it with water, and subsequently purify the crude dyestuff thus obtained by dissolving it in an alkaline solution of sodium hydrosulfite, allowing the solution to cool, filtering off the sodium salt of the pure or purified leuco dye which crystallizes out, washing it, and subsequently reoxidizing the leuco form to the dyestuff itself by means of air. The formulæ of the leuco form of the dye, and of the dyestuff itself, are probably as follows:

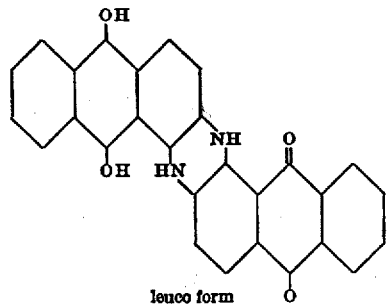

leuco form

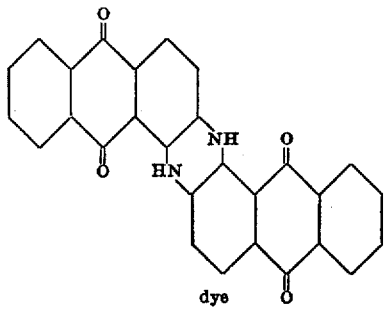

dye

I have found that it is much more advantageous to crystallize out the salt of the leuco dye directly from the solution in which the melt has been dissolved, collect it by filtration and subsequently oxidize it to the dyestuff. In this manner, the steps of precipitating the crude dyestuff from the aqueous solution of the melt, collecting it by filtration and washing it, prior to its purification by solution in alkaline sodium hydrosulfite, are eliminated. Further, since the dyestuff is already in the leuco form in the final melt and considerable amounts of caustic alkali are also present, there is considerable saving in the amount of caustic soda and sodium hydrosulfite required to be added to effect solution from which the alkali metal salt of the leuco compound crystallizes out.

In carrying out the present invention, when inert diluents are absent, or have been removed, the melt is poured into water and brought to the proper temperature. Sufficient sodium hydrosulfite is then added to effect solution of the dyestuff at this temperature. The amount of caustic alkali present should be sufficient to give about 3 to 4 percent solution. When solution of the dyestuff is effected, the solution is cooled and the alkali metal salt of the leuco dye, which crystallizes out, is filtered off and thoroughly washed with a dilute alkaline solution of sodium hydrosulfite. The alkali metal salt of the leuco dye is then suspended in water and a current of air passed through the mixture until the leuco dye is converted by oxidation to the dyestuff. The dyestuff is filtered off, washed thoroughly with water, and, if desired, dried. The following example will further illustrate the invention, the parts specified being by weight.

Example: The melt or fusion cake obtained by fusing 60 parts of 2-aminoanthraquinone with 200 parts caustic potash according to the usual and well-known procedure for the production of indanthrene blue R is treated with about 6000 parts water and brought to a temperature of 55°–60° C. 15 to 20 parts of sodium hydrosulfite (80 percent pure and free from zinc) are added and the temperature held at 55°–60° C. for about 30 minutes or until the dye is completely dissolved. When this stage is reached, the solution is cooled and maintained at a temperature of 38°–42° C., allowing it to stand until no further separation by crystallization of the alkali metal salt of the leuco dye takes place. This usually requires about 30–60 minutes. The product should separate in the form of welldefined crystals in order to effect maximum purification, and it is often advantageous to seed the solution at the crystallization temperature by the addition to it of crystals of the sodium salt of the leuco dye. The crystalline product is filtered off and washed with a 1.5 percent solution of caustic soda containing a little sodium hydrosulfite until the wash liquors are colorless, or nearly so. The filter-cake is suspended in 1500 parts of water at 50° C. and a current of air is passed through the mixture until the leuco dye is completely oxidized to the dyestuff as shown by its insolubility in alcohol. The temperature is then raised to 70–80° C., the product is filtered off and washed with warm water until it is free from alkali. The product may be kept as paste or it may be dried.

In case the melt is that obtained by fusing 2-aminoanthraquinone with caustic potash in the presence of an inert solvent, the reaction mass may be either filtered from the inert solvent or the solvent may be steam distilled, or the inert solvent may be otherwise separated, and the residual product then worked up and purified in a manner similar to that described in the above example.

The process of purification is also similar to that described in the above example for melts which have been obtained by fusing 2-aminoanthraquinone with caustic alkali with or without the addition of oxidizing or reducing agents, or both. The specific proportions and conditions given in the above example can be varied, it being understood that the invention is illustrated thereby but is not limited thereto. For example, the amount of water and the temperature of the solution in which the crude melt is dissolved may be varied, depending on the amount and concentration of the caustic alkali and alkali metal salts present since their presence tends to salt out the leuco dye. It is preferable to employ such amounts and concentrations that temperatures between 50–70° C. are used. Further, only that amount of hydrosulfite should be used which is able to effect and maintain the leuco dye in solution before cooling for crystallization. A large excess should be avoided. The temperature to which the solution is cooled to bring about crystallization of the alkali metal salt of the leuco dye without undue loss from solubility is also a function of the amount and concentration of the alkaline salts present, and, as a rule, lower temperatures, say 30° to 35°, are required when the amount or concentration of such salts present is decreased. Also, the salt of the leuco dye may be oxidized by the air to the dye at various temperatures ranging from room-temperature to the boiling point of the solution.

It will thus be seen that the improved process of the present invention eliminates the precipitation of the dye by oxidation from a solution of the melt, and also eliminates the step of redissolving the precipitated dye; and combines the purification operation with the treatment of the melt so that the purification is effected directly from such solution, thus taking advantage of the caustic alkali which the solution of the melt contains and materially reducing the amount of caustic alkali and alkali metal hydrosulfite required in the purification; while nevertheless giving the dyestuff in a purified state in the form of the leuco compound which is precipitated directly from the solution of melt and which, on oxidation, gives the dyestuff itself in a purified condition.

I claim:

1. In the process of making N-dihydro-1.2-1'.2'-anthraquinonazine by subjecting 2-aminoanthraquinone to the action of molten caustic potash wherein a fused reaction-mass is obtained, the steps which comprise dissolving said fused mass in water and crystallizing the alkali metal salt of the leuco dye from the resulting solution.

2. In the process of making N-dihydro-1.2-1'.2'-anthraquinonazine by subjecting 2-aminoanthraquinone to the action of molten caustic potash wherein a fused reaction-mass is obtained, the steps which comprise dissolving said fused mass in water, crystallizing the alkali metal salt of the leuco dye from the resulting solution, and subjecting the alkali metal salt of the leuco dye in the presence of water to oxidation.

3. The process of purifying N-dihydro-1.2-1'.2'-anthraquinonazine which comprises dissolving in water containing sodium hydrosulfite and at a temperature of about 50–70° C., the crude melt obtained by fusing 2-aminoanthraquinone with caustic potash, cooling the solution to a temperature of about 30°–45° C., collecting the alkali metal salt of the leuco dye which crystallizes out, and passing a current of air through an aqueous suspension of the alkali metal salt of the leuco dye, whereby purified N-dihydro-1.2-1'.2'-anthraquinonazine is obtained.

4. In the process of making N-dihydro-1.2-1'.2'-anthraquinonazine by subjecting 2-aminoanthraquinone to the action of molten caustic potash wherein a fused reaction-mass is obtained, the steps which comprise dissolving said mass in water containing an alkali metal hydrosulfite and crystallizing therefrom the alkali metal salt of the leuco dye.

5. In the process of making N-dihydro-1.2-1'.2'-anthraquinonazine by subjecting 2-aminoanthraquinone to the action of molten caustic alkali wherein a fused reaction-mass is obtained, the steps which comprise dissolving said fused mass in water containing sodium hydrosulfite, crystallizing and separating the alkali metal salt of the leuco dye from the resulting solution, and subjecting the alkali metal salt of the leuco dye in the presence of water to the action of air whereby N-dihydro-1.2-1'.2'-anthraquinonazine is produced.

6. In the process of making N-dihydro-1.2-1'.2'-anthraquinonazine by heating 2-aminoanthraquinone in the presence of caustic potash wherein a fused reaction-mass is obtained, the steps which comprise dissolving said mass in the fused state in water, heating the solution to about 50° to 70° C., adding sufficient sodium hydrosulfite to effect and maintain the leuco dye in solution at this temperature, cooling the solution to about 30° to 35° C., and separating the alkali metal salt of the leuco dye which crystallizes out.

7. In the process of making N-dihydro-1.2-1'.2'-anthraquinonazine by subjecting 2-aminoanthraquinone to the action of molten caustic alkali wherein a fused reaction mass is obtained, the treatment of the reaction mass with an aqueous solution containing sufficient alkali metal hydrosulfite to dissolve impurities and separating the solution of impurities thus formed.

8. In the process of making N-dihydro-1.2-1'.2'-anthraquinonazine by subjecting 2-aminoanthraquinone to the action of molten caustic alkali wherein a fused reaction mass is obtained, the treatment of the reaction mass with an aqueous solution containing alkali metal hydrosulfite with heating to dissolve both the leuco dye and impurities and subsequent cooling to separate the leuco dye from the solution of impurities followed by separation of the dye from the solution.

9. As a new product, the dyestuff obtainable by suspending in a dilute alkali solution containing hydrosulfite the anthraquinone derivatives resulting from the fusion of beta-aminoanthraquinone with caustic alkali, with maintenance of the temperature at a point to produce a liquid mixture in which crystals of the leuco dye are suspended in a solution of impurities and filtering off and washing the leuco dye, the dye thus obtainable giving dyeings which are brighter, stronger and more resistant to the action of bleaching liquor than the dyes given by the leuco dye produced by separation of both the dye and impurities together, and subsequent reduction and separation of the dye from impurities.

In testimony whereof I affix my signature.

DONALD G. ROGERS.

CERTIFICATE OF CORRECTION.

Patent No. 1,679,230.  Granted July 31, 1928, to

DONALD G. ROGERS.

It is hereby certified that error appears in the printed specification of the above numbered patent requiring correction as follows: Page 1, line 14, for the misspelled word "filtaration" read "filtration"; same page, line 24, in the formula, the indication of one oxygen in the leuco-form shown singly bonded to the nucleus should be doubly bonded; and that the said Letters Patent should be read with these corrections therein that the same may conform to the record of the case in the Patent Office.

Signed and sealed this 28th day of August, A. D. 1928.

(Seal)

M. J. Moore,
Acting Commissioner of Patents.

dye from the resulting solution, and subjecting the alkali metal salt of the leuco dye in the presence of water to the action of air whereby N-dihydro-1.2-1'.2'-anthraquinonazine is produced.

6. In the process of making N-dihydro-1.2-1'.2'-anthraquinonazine by heating 2-aminoanthraquinone in the presence of caustic potash wherein a fused reaction-mass is obtained, the steps which comprise dissolving said mass in the fused state in water, heating the solution to about 50° to 70° C., adding sufficient sodium hydrosulfite to effect and maintain the leuco dye in solution at this temperature, cooling the solution to about 30° to 35° C., and separating the alkali metal salt of the leuco dye which crystallizes out.

7. In the process of making N-dihydro-1.2-1'.2'-anthraquinonazine by subjecting 2-aminoanthraquinone to the action of molten caustic alkali wherein a fused reaction mass is obtained, the treatment of the reaction mass with an aqueous solution containing sufficient alkali metal hydrosulfite to dissolve impurities and separating the solution of impurities thus formed.

8. In the process of making N-dihydro-1.2-1'.2'-anthraquinonazine by subjecting 2-aminoanthraquinone to the action of molten caustic alkali wherein a fused reaction mass is obtained, the treatment of the reaction mass with an aqueous solution containing alkali metal hydrosulfite with heating to dissolve both the leuco dye and impurities and subsequent cooling to separate the leuco dye from the solution of impurities followed by separation of the dye from the solution.

9. As a new product, the dyestuff obtainable by suspending in a dilute alkali solution containing hydrosulfite the anthraquinone derivatives resulting from the fusion of beta-aminoanthraquinone with caustic alkali, with maintenance of the temperature at a point to produce a liquid mixture in which crystals of the leuco dye are suspended in a solution of impurities and filtering off and washing the leuco dye, the dye thus obtainable giving dyeings which are brighter, stronger and more resistant to the action of bleaching liquor than the dyes given by the leuco dye produced by separation of both the dye and impurities together, and subsequent reduction and separation of the dye from impurities.

In testimony whereof I affix my signature.

DONALD G. ROGERS.

---

CERTIFICATE OF CORRECTION.

Patent No. 1,679,230.            Granted July 31, 1928, to

DONALD G. ROGERS.

It is hereby certified that error appears in the printed specification of the above numbered patent requiring correction as follows: Page 1, line 14, for the misspelled word "filtaration" read "filtration"; same page, line 24, in the formula, the indication of one oxygen in the leuco-form shown singly bonded to the nucleus should be doubly bonded; and that the said Letters Patent should be read with these corrections therein that the same may conform to the record of the case in the Patent Office.

Signed and sealed this 28th day of August, A. D. 1928.

(Seal)

M. J. Moore,
Acting Commissioner of Patents.